United States Patent Office 3,240,002
Patented Mar. 15, 1966

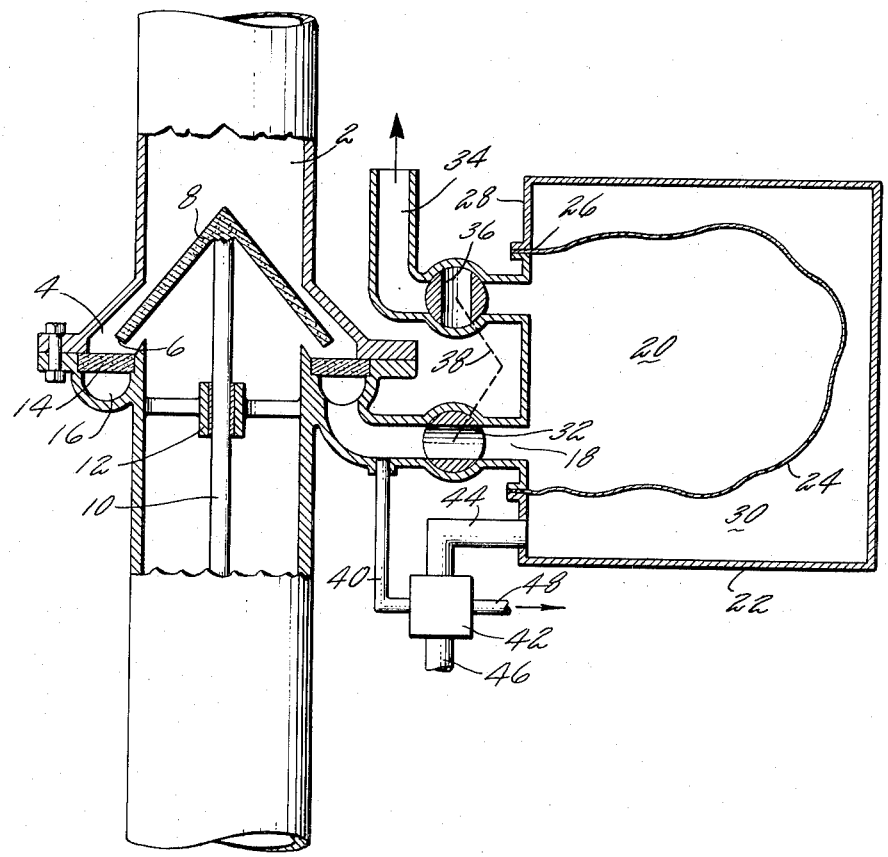

3,240,002
LIQUID SEPARATOR FOR GRAVITY-FREE ENVIRONMENT
Thomas E. O'Rourke, Jr., East Hartford, Mario J. Diotalevi, Somers, and David L. Fitton, Hazardville, Conn., assignors to United Aircraft Corporation, East Hartford, Conn., a corporation of Delaware
Filed Nov. 30, 1961, Ser. No. 155,955
1 Claim. (Cl. 55—400)

This invention relates to a liquid-gas separator for use particularly in gravity-free environments.

One feature of the invention is a porous plate for removing the liquid from the gases using the capillary action of the liquid in flowing it through the plate. Another feature is a centrifugal separator for initial deposition of the liquid from the mixture of gas and liquid onto the plate. Another feature is an arrangement for continually wetting the back side of the porous plate to cause a flow of the liquid toward the back side of the plate by capillary action.

One feature of the invention is an arrangement for collecting the liquid from the plate and for dispensing some of the liquid without losing the wetting action on the plate.

Other features and advantages will be apparent from the specification and claim, and from the accompanying drawing which illustrates an embodiment of the invention.

The single figure is a diagrammatic view of the device.

As shown, the device includes a duct 2 through which a mixture of liquid and gas is supplied, for example, from a fuel cell system as used in a space vehicle. Even if the device is in a gravity-free environment the mixture in the duct will flow through the duct by reason of a pressure differential in the duct. That is to say, the pressure at the downstream end of the duct is lower than at its upstream end. As far as the present invention is concerned, flow may be in either direction but may be assumed to be in a downward direction as shown on the drawing. The duct has an annular recess 4 formed therein and this recess surrounds the rim 6 of a conical centrifugal separator 8 which is mounted on a shaft 10 supported by a bearing 12 in the duct. The conical separator 8 is preferably made of a porous hydrophobic material such as a "Teflon" mesh which will permit only the flow of gas therethrough. The "Teflon" mesh is either a knitted, woven or felted arrangement of Teflon fibers which is rigid enough to retain the conical shape shown when in use. The rotation of the cone 8 will discharge liquid from the cone into the annular recess 4.

One wall of the recess 4 is a porous metallic plate 14 positioned in such a manner as to form a dividing wall between the recess 4 and another concentric recess 16 also surrounding the duct. The recess 16 is connected by a conduit 18 to a chamber 20 within a tank 22. A flexible diaphragm 24, attached at its edge 26 to one wall 28 of the tank, constitutes a moving wall between the chamber 20 and another chamber 30 which constitutes the remainder of the space within the tank.

A valve 32 is located in the conduit 18 and is regularly open. An outlet duct 34 communicates with the chamber 20 through the wall 28 and this outlet duct has a normally closed valve 36 therein. A linkage 38 or other suitable adaptation interconnects the valves 32 and 36 so that they will move in unison and the valve 32 will be closed when the valve 36 is opened. With this arrangement the chamber 20, the conduit 18 and the annular recess 16 are kept full of liquid so that the surface of the plate 14 facing the recess 16 is kept wet at all times. Accordingly, any liquid in the recess 4 that contacts the surface of plate 14 that faces the recess 4 will be carried through the plate by capillary action and thence into the recess 16. The action of the centrifugal separator in spinning off liquid into the recess 4 will develop a slightly higher pressure in the liquid on the surface of plate 14 exposed to recess 4 than the pressure on the opposite side which is enough to assist the capillary action in flowing the liquid into recess 16.

The pressure in chamber 30 is maintained the same as that in the chamber 20 so that there will be no resistance to the flow of liquid from the recess 16 into the chamber 20. To accomplish this a duct 40 from the recess 16 to a valve 42 senses the pressure in the recess 16 and maintains a supply of gas, such as nitrogen, from the valve 42 through a duct 44 to a chamber 30. The valve 42 has a gas supply duct 46 and a gas discharge duct 48. The valve 42 is a conventional pressure equalizing valve and the details of this valve are not a part of this invention.

It will be understood that the pores in the plate 14 are of such a dimension that the liquid will flow through the plate by capillary attraction but these pores, being kept full of liquid by capillary action, will not permit the flow of gas therethrough. If liquid from the chamber 20 is needed in the space vehicle in which this device may be utilized, the valve 36 may be opened and liquid removed through the duct 34. When this occurs, since the valve 32 is closed at the same time, the recess 16 will remain filled with liquid so that the plate 14 will have its surface continuously wetted by the liquid.

It is to be understood that the invention is not limited to the specific embodiment herein illustrated and described, but may be used in other ways without departure from its spirit as defined by the following claim.

We claim:

A liquid-gas separator including a duct for a gas and liquid mixture, a centrifugal separator in said duct, said separator including a substantially conical porous member rotatable on an axis substantially coaxial with the duct and having the periphery of the conical member substantially concentric to and spaced from the axis, an annular recess in the duct adjacent to the periphery of the conical member, and into which the periphery of the conical member extends, said recess receiving liquid deposited on the conical member from the mixture and discharged into the recess by the rotation of said conical member, a porous plate forming one wall of said annular recess, said wall extending to the periphery of the annular recess, means for maintaining a liquid in contact with the surface of the plate remote from the recess, a tank having a flexible diaphragm therein which defines first and second chambers, said first chamber being in communication with the surface of the plate remote from the recess for collecting liquid from the plate, and said second chamber being in communication with a source of fluid under pressure and means for maintaining equal pressures in both chambers.

References Cited by the Examiner
UNITED STATES PATENTS

| | | | |
|---|---|---|---|
| 1,405,259 | 1/1922 | Beach | 55—464 X |
| 2,085,390 | 6/1937 | Quinlivan | 261—104 |
| 2,158,863 | 5/1939 | Randall | 55—463 |
| 2,440,580 | 4/1948 | Gazda | 261—99 |
| 2,530,716 | 11/1950 | Maynier | 261—99 X |
| 2,541,838 | 2/1951 | Shardlow | 55—523 |
| 2,542,095 | 2/1951 | Rouget | 55—400 X |
| 2,575,568 | 11/1951 | Topanelian | 55—400 X |
| 2,600,372 | 6/1952 | Milliken et al. | 233—7 |
| 2,838,294 | 6/1958 | Skerritt | 261—104 |
| 2,857,979 | 10/1958 | Van Dijck | 55—523 X |
| 2,954,841 | 10/1960 | Reistle | 55—218 |

ROBERT F. BURNETT, *Primary Examiner.*

HARRY B. THORNTON, HERBERT L. MARTIN,
*Examiners.*